United States Patent [19]

Mori et al.

[11] Patent Number: 5,247,615
[45] Date of Patent: Sep. 21, 1993

[54] CONTROL METHOD AND SYSTEM FOR ESTABLISHING A CONNECTION AMONG TERMINALS FORMING A JOINT PROJECT INFORMATION PROCESSING SYSTEM

[75] Inventors: Kenjiro Mori, Machida; Yoshiyuki Nakayama, Yokohama; Fumio Nakamura, Kawasaki; Tadashi Yamamitsu, Hadano, all of Japan

[73] Assignee: Hitachi, Ltd., Tokyo, Japan

[21] Appl. No.: 631,238

[22] Filed: Dec. 20, 1990

[30] Foreign Application Priority Data

Dec. 21, 1989 [JP] Japan ................................. 1-333817

[51] Int. Cl.$^5$ ............................................ G06F 13/00
[52] U.S. Cl. .................................. 395/200; 370/85.12
[58] Field of Search .................. 364/DIG. 1, DIG. 2; 340/825.05, 825.06; 370/85.12; 395/200, 325

[56] References Cited

U.S. PATENT DOCUMENTS 5,014,192 5/1991 Mansfield et al. .............. 395/425 X

*Primary Examiner*—Robert L. Richardson
*Attorney, Agent, or Firm*—Antonelli, Terry, Stout & Kraus

[57] ABSTRACT

A system including a plurality of terminal apparatuses connected to each other via a communication network for achieving joint information processing, such as involved in an electronic joint project and an electronic meeting. The terminal apparatuses are interconnected to each other via a logical ring path formed on the communication network. Each terminal apparatus is loaded with a control program for supervising the joint information processing. Each control program functions in cooperation with control programs of other terminal apparatuses to conduct communication procedures for establishing, for changing, or for terminating the logical ring path and to control a display operation to supply the user with information identifying those members currently participating in the joint information processing.

3 Claims, 15 Drawing Sheets

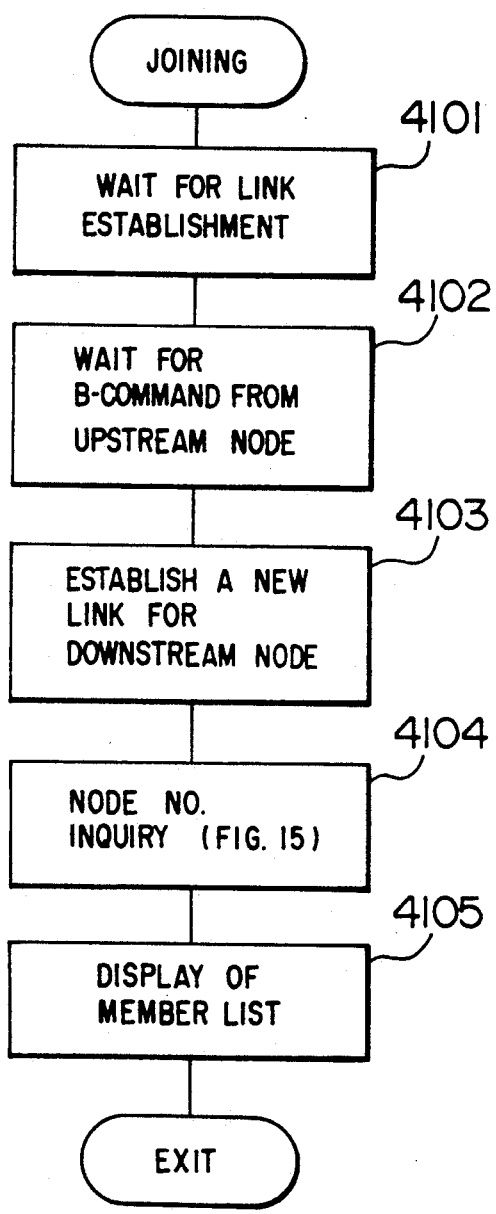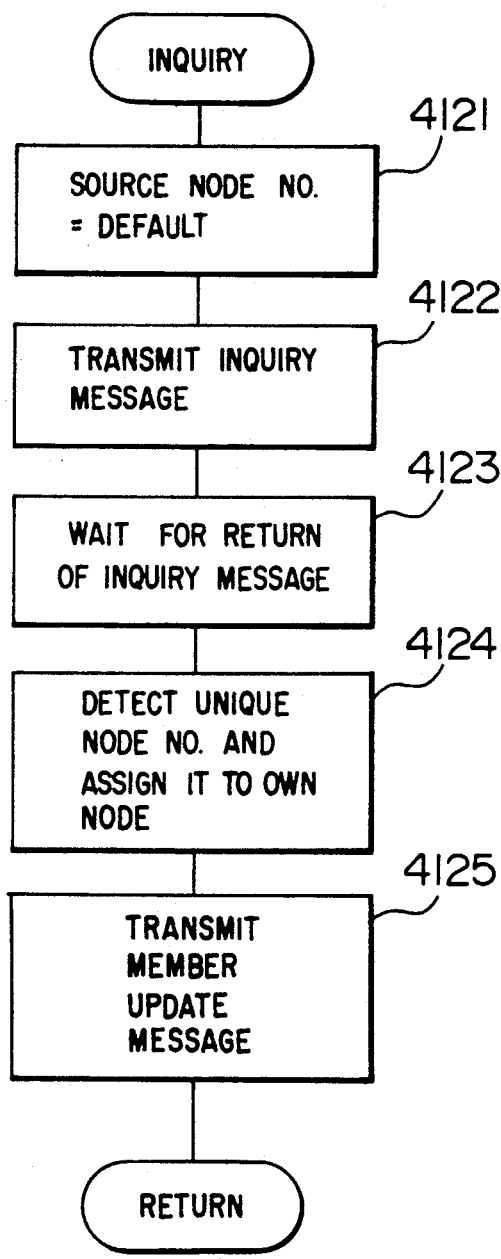

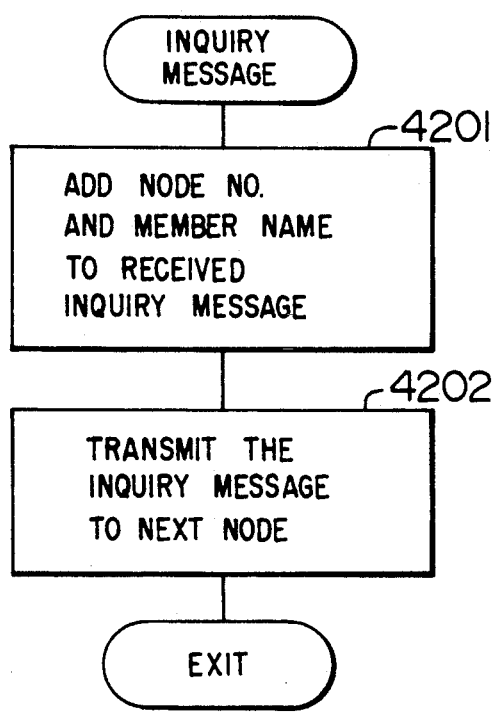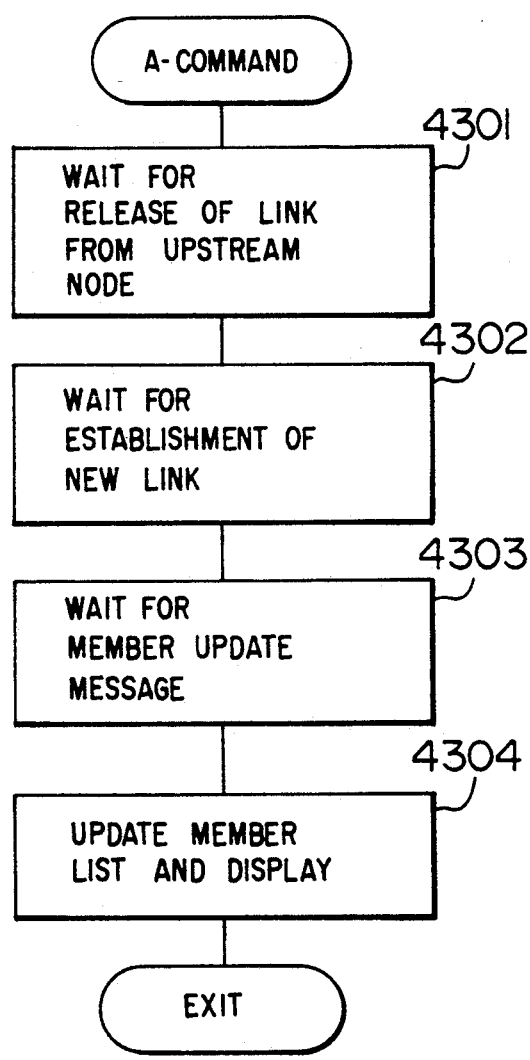
FIG. 16
FIG. 17

CONTROL METHOD AND SYSTEM FOR ESTABLISHING A CONNECTION AMONG TERMINALS FORMING A JOINT PROJECT INFORMATION PROCESSING SYSTEM

BACKGROUND OF THE INVENTION

The present invention relates to a joint project information processing system including a plurality of terminal apparatuses or stations, and in particular, to an information processing system in which a plurality of terminal apparatuses, such as microcomputers and workstations, each having a display, are linked with each other via a communication network, so that users of the respective terminal apparatuses achieve various jobs, for example, document editing, conferencing, and/or joint work or conversation, while referring to an identical display screen of information presented on the displays of the respective terminal apparatuses.

In an information processing system including a plurality of terminal apparatuses linked with each other via communication lines, wherein a data item or a command inputted from a terminal is communicated to other terminals such that the information displayed on the output screen of the respective terminals is modified in response to the data item or command, by providing an audio communication link via telephone sets between the users of the respective terminals, a conferencing system involving both electronic data and voice transmission between terminals may be advantageously configured.

SUMMARY OF THE INVENTION

In such a joint information processing system comprising a plurality of terminal apparatuses of terminals, it is desirable that the joining of a member in and withdrawal of a member from the conferencing arrangement involving a joint project be easily achieved and the current members participating therein be simply recognized. In this regard, a joint project differs from a typical conferencing arrangement in that it includes not only voice communication characteristic of telephone conferencing, but also electronic data transfer between stations to facilitate an integrated job processing.

It is therefor an object of the present invention to provide a joint information processing system including a plurality of terminals capable of facilitating the joining of a member in and withdrawal of a member from a joint project.

Another object of the present invention is to provide a joint information processing system including a plurality of terminals wherein the current members of a joint project can be easily confirmed by the members from their respective terminals.

Still another object of the present invention is to provide a display control method for use in a joint information processing system including a plurality of terminals wherein the current members joining in a joint project can be easily confirmed by the members from their respective terminals.

In order to achieve the objects stated above, according to the present invention, in a joint information processing system including a plurality of terminal apparatuses linked with each other via a communication network, each terminal apparatus comprises input means to be operated by a user for inputting a data item or a command, data process means for executing a predetermined data processing operation depending on the input data item or the command received from said input means and the communication network and for transferring the input data or the command to one of the other terminal apparatuses via the communication network in an order in which the input data or the command is received, and display means for displaying thereon results of data processing accomplished by the data process means. Moreover, the data process means further includes means cooperative with data process means disposed in another terminal apparatus for configuring a logical ring path to connect in a ring shape a plurality of data process means via the communication network, memory means for storing therein a node identifier assigned to each data process means linked via the logical ring path and user identification information of the terminal associated with each data process means, and means for supplying the display means with the user identification information loaded in the memory means.

In accordance with another feature of the present invention, each data process means comprises means responsive to an input of a command indicating joining of a member in or a withdrawal of a member from a joint information processing system for cooperating with upstream and downstream data process means adjacent thereto on the logical ring path to establish or to change the logical ring path and means responsive to the establishment or the change of the logical ring path for updating contents stored in the memory means.

The foregoing and other objects, advantages, manner of operation and novel features of the present invention will be understood from the following detailed description when read in connection with the accompanying drawings.

BRIEF DESCRIPTION OF THE DRAWINGS

FIGS. 13 to 19 are flowcharts of programs to be executed in each terminal for controlling the joining an withdrawal operations with respect to a joint project.

DESCRIPTION OF THE PREFERRED EMBODIMENTS

Figure 1:
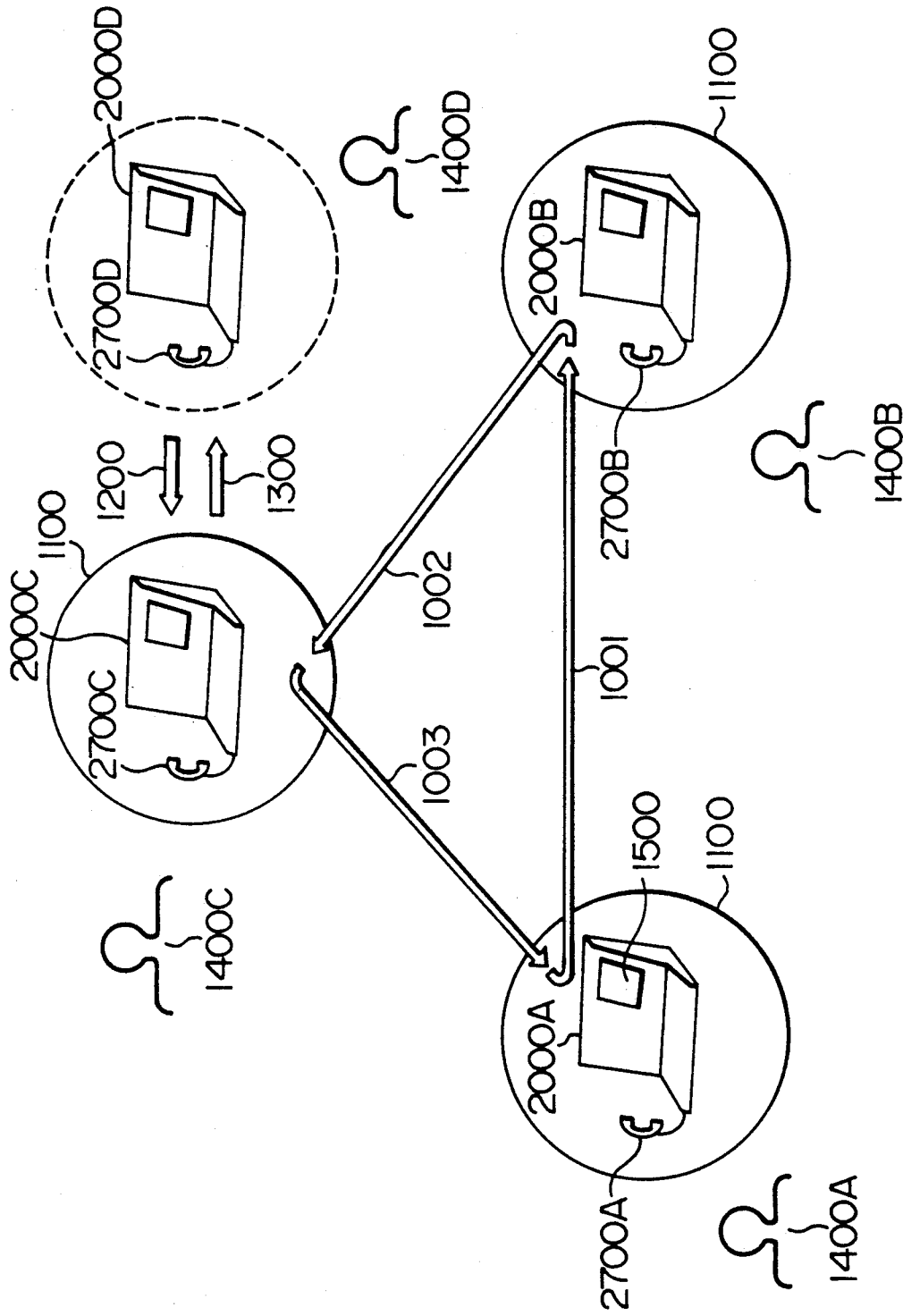
FIG. 1 is a diagram schematically showing the functional outline of a joint information processing system according to the present invention.

FIG. 1 is a diagram illustratively showing an outline of functions including a joining function 1200 and a withdrawing function 1300 in which a user joins in and withdraws from a joint information processing project participated in by stations 1100 and a list function 1500 for displaying the members participating in the joint project. The joining function 1200 is assumed to be accomplished by a participant (receiver), for example, a user 1400C who has received a joining request. In order to beforehand communicate the request and the acceptance of the joining request from the user 1400D requesting the joining operation and the receiver 1400C, telephone sets 2700 (2700A to 2700D) or the like are employed. In this situation, the user requesting the participation or a participant asking another person to join in the joint project communicates with a partner for initiating the joining and the acceptance thereof. In this connection, the stations 1100 represent a plurality of persons at respective separated places who virtually participate in a meeting or joint project by use of screen information produced from respective workstations and voice information from the telephone sets.

Figure 2:
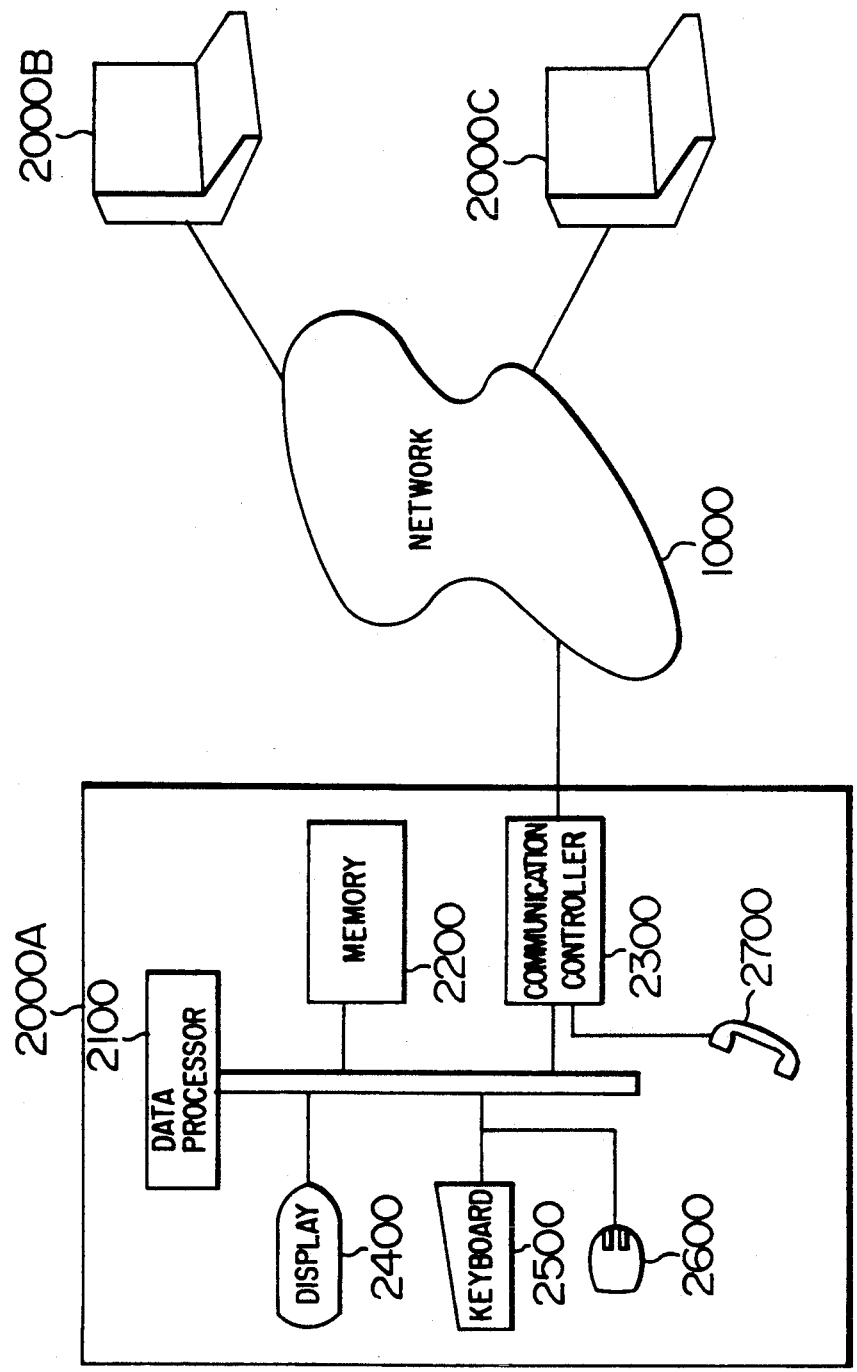
FIG. 2 is a diagram showing the constitution of a terminal station.

FIG. 2 shows an example of a hardware constitution of a joint information processing and communication system to which the present invention is applied. A communication network 1000 may be implemented by an integrated services digital network (ISDN), a combination of a local network (LAN) and a telephone switch network, or the like. A workstation 2000 includes a data processor for executing a joint project execution program and an application program, a memory 2200, a communication controller 2300, input devices such as a keyboard 2500 and a mouse 2600 for inputting a user name and for handling interactive inputs, and a display 2400 for presenting screen outputs in association with application or job programs. A telephone set 2700 for audio input/output operations is used to request communication with a partner and to exchange ideas and opinions regarding documents with the partner.

Figure 3:
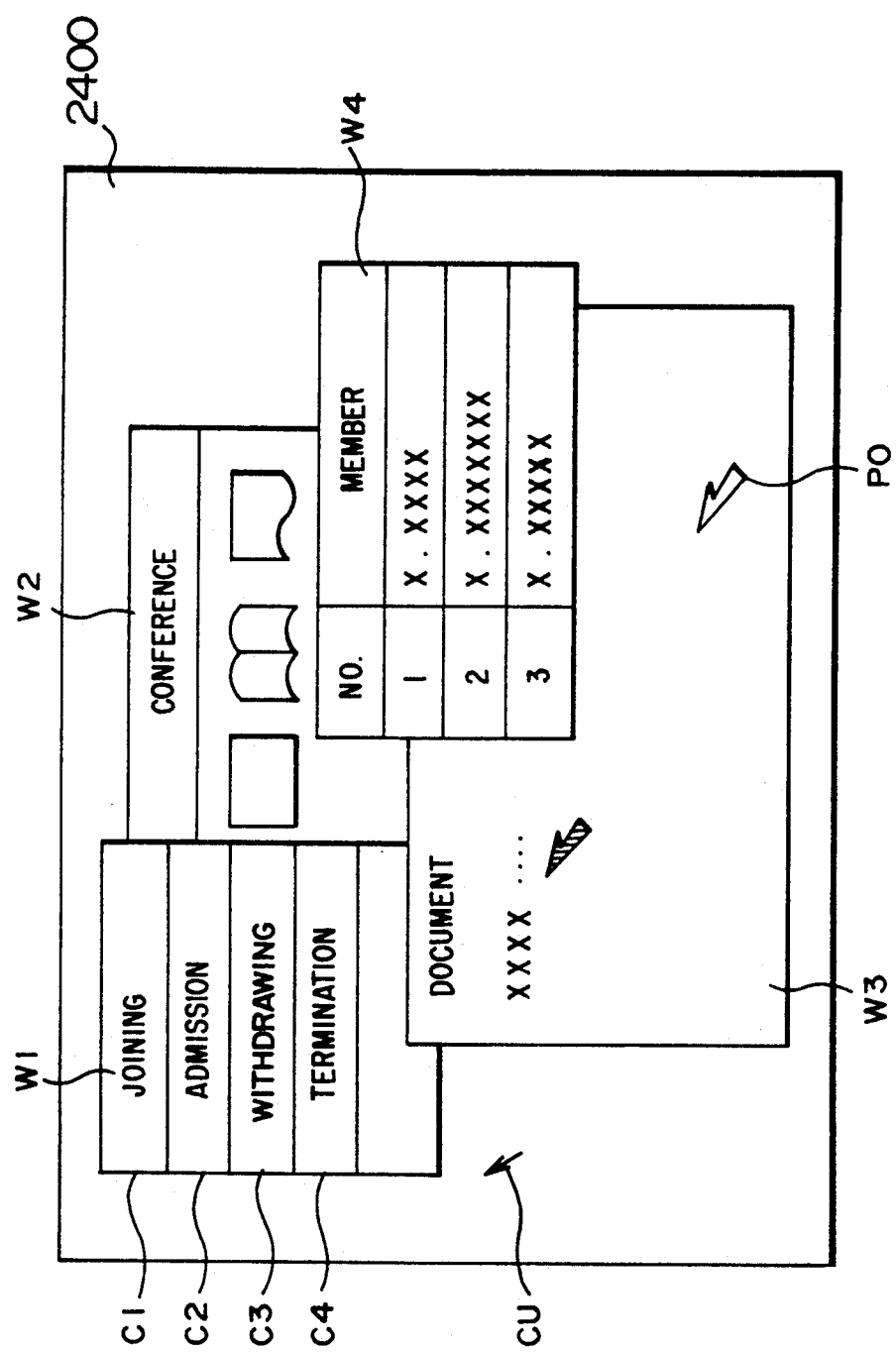
FIG. 3 is a diagram showing an example of a display screen of the terminal station.

Each workstation 2000 is provided with a multi-window display function for presenting, as shown in FIG. 3, a plurality of windows W1 to W4, for example. In the example of FIG. 3, the window W1 shows a menu of job execution commands employed, for example, to initiate a joint information processing project, such as an electronic communication or a conferencing, or to change the configuration associated with the number of members or the like. This system supports the joint project execution commands including Joining C1, Admission C2, Withdrawing C3, and Termination C4. The window W2 shows a list of resources adopted in a joint project state, more specifically, a plurality of resources are presented in the form of icons. When an icon is selected by a cursor CU in cooperation with the mouse 2600, the content of the specified resource is presented on the window W3.

A participant (user) of the electronic communication may adopt, in addition to the cursor CU, a pointing object (PO) prepared for each user to point to a position in the resource window. When the user desires to change a location of the pointing object assigned thereto, it is only required to overlap the cursor CU with the pointing object so as to move the pointing object to a desired position. The window W4 shows a list of members currently joining in the electronic communication. The contents of the list correspond to those of the list 1500 of FIG. 1.

Figure 4:
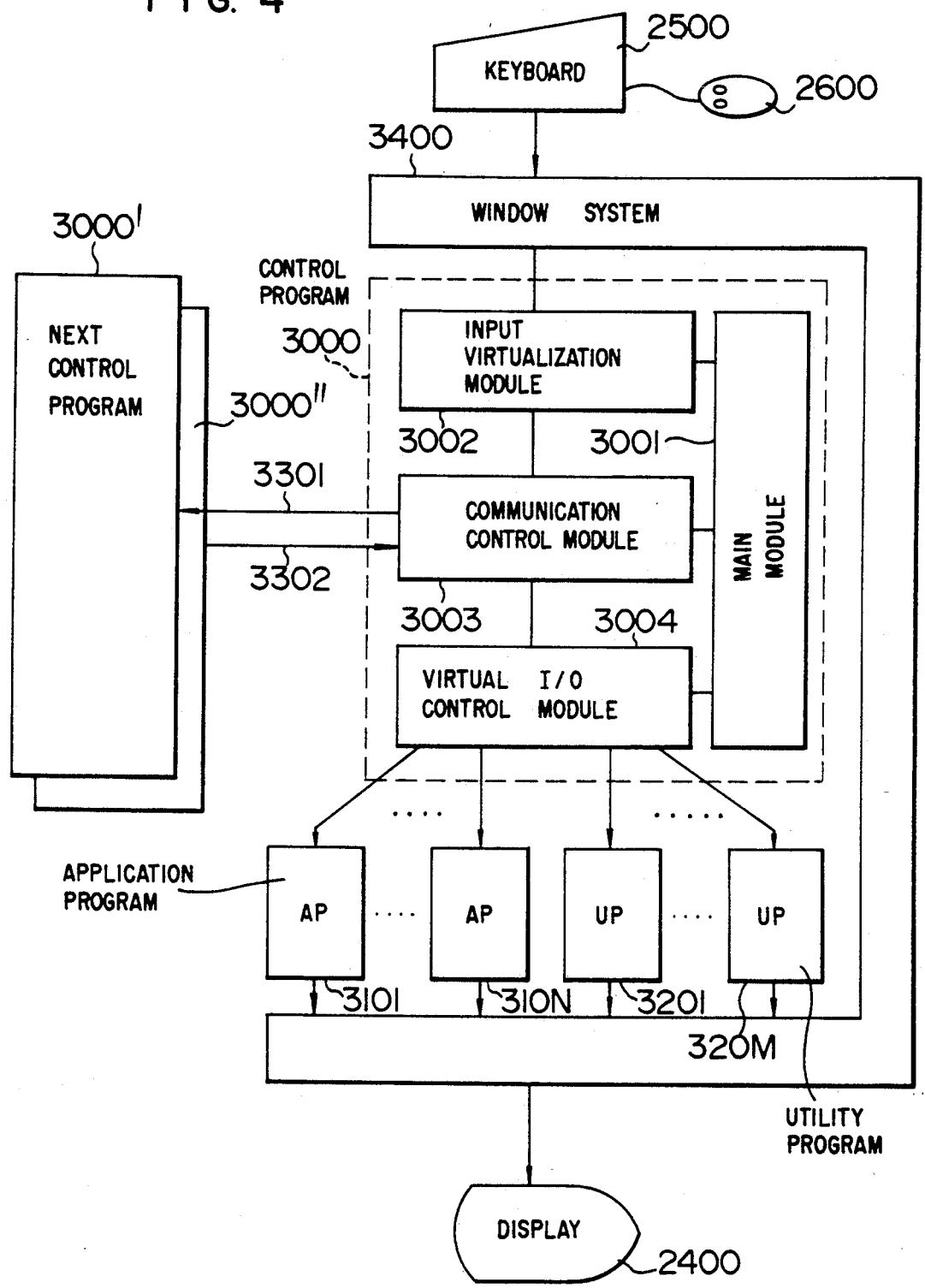
FIG. 4 is a schematic diagram showing a software configuration of each terminal station for the joint information processing.

FIG. 4 shows the constitution of a software system implementing the joint project processing to be loaded in each workstation. A window system 3400 supports interfaces between the various kinds of programs (application programs 3101 to 310N and utility programs 3201 to 320M) to be executed by the processor 2100 and the input devices (such as the keyboard 2500 and the mouse 2600) and/or the output device (display 2400).

Data or an instruction (to be referred to as input data including the instruction herebelow) supplied from an input device is fed via the window system 3400 to a joint project control program 3000, which passes the input data to one of the programs 3101 to 320M or to a joint project program loaded in another workstation. The application programs 3101 to 310N available in the electronic communication includes, for example, a document editing program, a list or table computation program, and a blackboard control program. When a user inputs data to a window of a workstation, an application program associated with the window is started to execute data processing for the input data. The input data is transferred via a logical communication path 3301 between the programs to a communication control program 3000' operating in a workstation on a downstream side. On the other hand, input data supplied from a workstation on an upstream side is fed from a joint project control program 3000" of the workstation through a logical path 3302 to the joint project control program 3000. The joint project control program of a workstation conducts an identical processing on data input therefrom and on data supplied from any other workstations Namely, the workstations cooperatively execute the data processing. As a result, the respective users can carry on a conversation through telephone lines while referencing the same display screens. The utility programs 3201 to 320M are disposed to further facilitate usages of application programs in a joint project environment. This is the case, for example, of the pointing object control program mentioned above.

The joint project control program 3000 includes an input virtualization module 3002, a communication control module 3003, a virtual I/O control modula 3004, and a main module 3001 initiating executions of these modules in a predetermined sequence.

Input data supplied by the use from the input device 2500 or 2600 is sent via the window system 3400 to the input virtualization module 3002, which then adds a header including a participant identifier and the like to the input data, thereby converting the data into a data format (virtual input) for the system. In this way, the input data can be adapted to any of the object program in the communication system. The input virtualization module 3002 transfers the resultant virtual input data to the communication control module 3003. This module 3003 communicates with another joint project control program to pass input data supplied from an input device to an application program and/or a utility program in another workstation. Moreover, the communication control program 3003 passes the input data via the virtual I/O interface module 3004 to an application program and/or a utility program under the control program 3000 of its own workstation. The virtual user interface module 3004 supplies an appropriate application program and/or a utility program with the received virtual input data directly or after modifying the format thereof. The application programs 3101 to 310N and the utility programs 3201 to 320M each achieve a processing o the input data thus received to reflect a result of the processing via the window system 3400 onto the output device 2400.

The configuration, basic operations, and fundamental functions of program modules of the terminal apparatus mentioned above have been described in detail in the specifications of U.S. patent application Ser. No. 350,850 and U.S. patent application Ser. No. 614,087, filed Nov. 15, 1990 based on Japanese Patent Application 1-294983 (1989), assigned to the present assignee, the contents of which are incorporated herein by reference.

Figure 5:
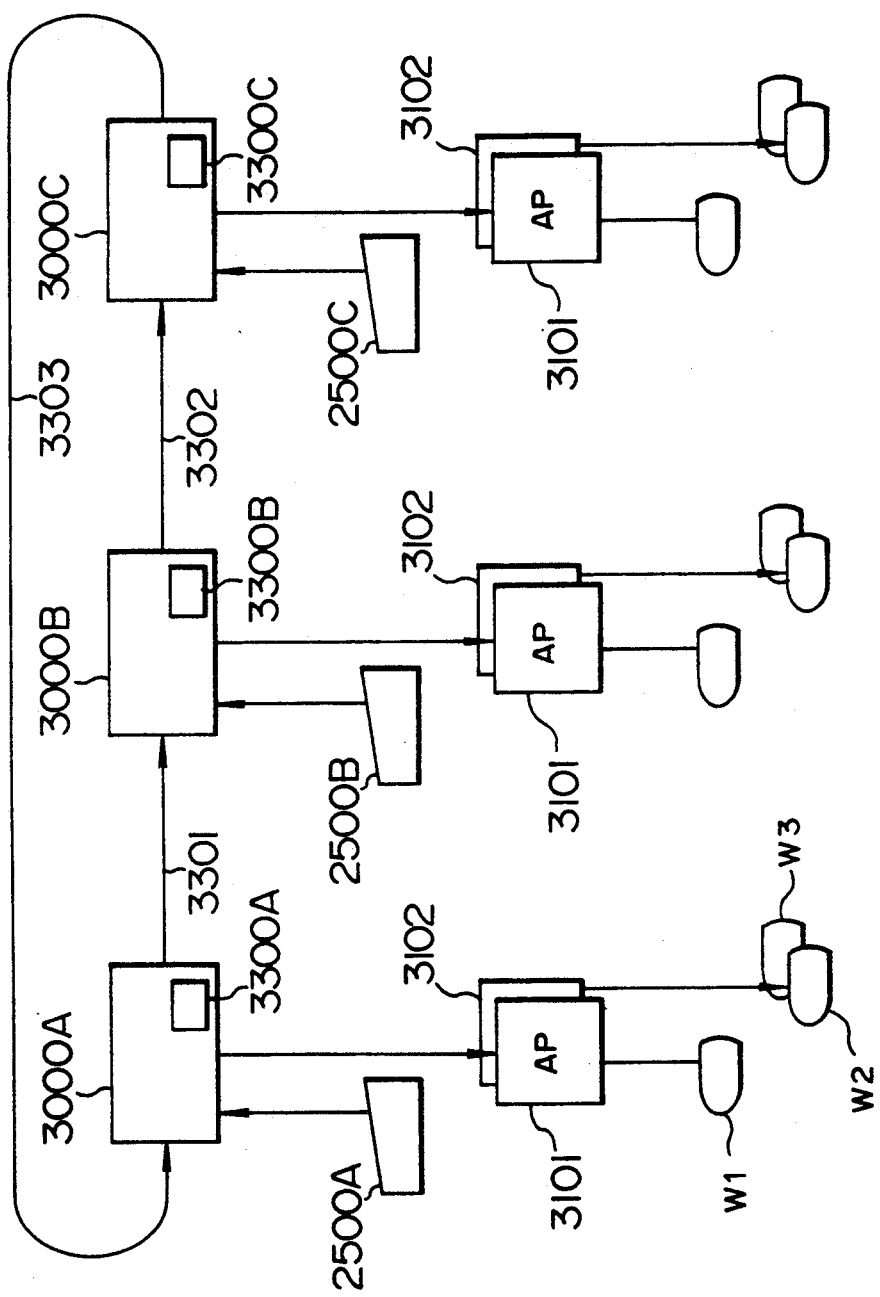
FIG. 5 is a diagram showing relationships with respect to software in the joint information processing system constituted with three terminal apparatuses.

FIG. 5 shows a constitution of an electronic communication system including three workstations 2000A to 2000C, which are loaded with joint project control programs 3000A to 3000C, respectively. These control programs are linked with each other via a ring-like logical communication path formed on the network 1000. In the following description, each control program is called a node and each of the communication paths therebetween 3301, 3302, and 3303 is called a logical link or is simply called a link. Moreover, in an electronic communication state, an identifier assigned to each control program is referred to by a node number. Reference numerals 3300A to 3300C denote node number storing areas.

Figure 6:
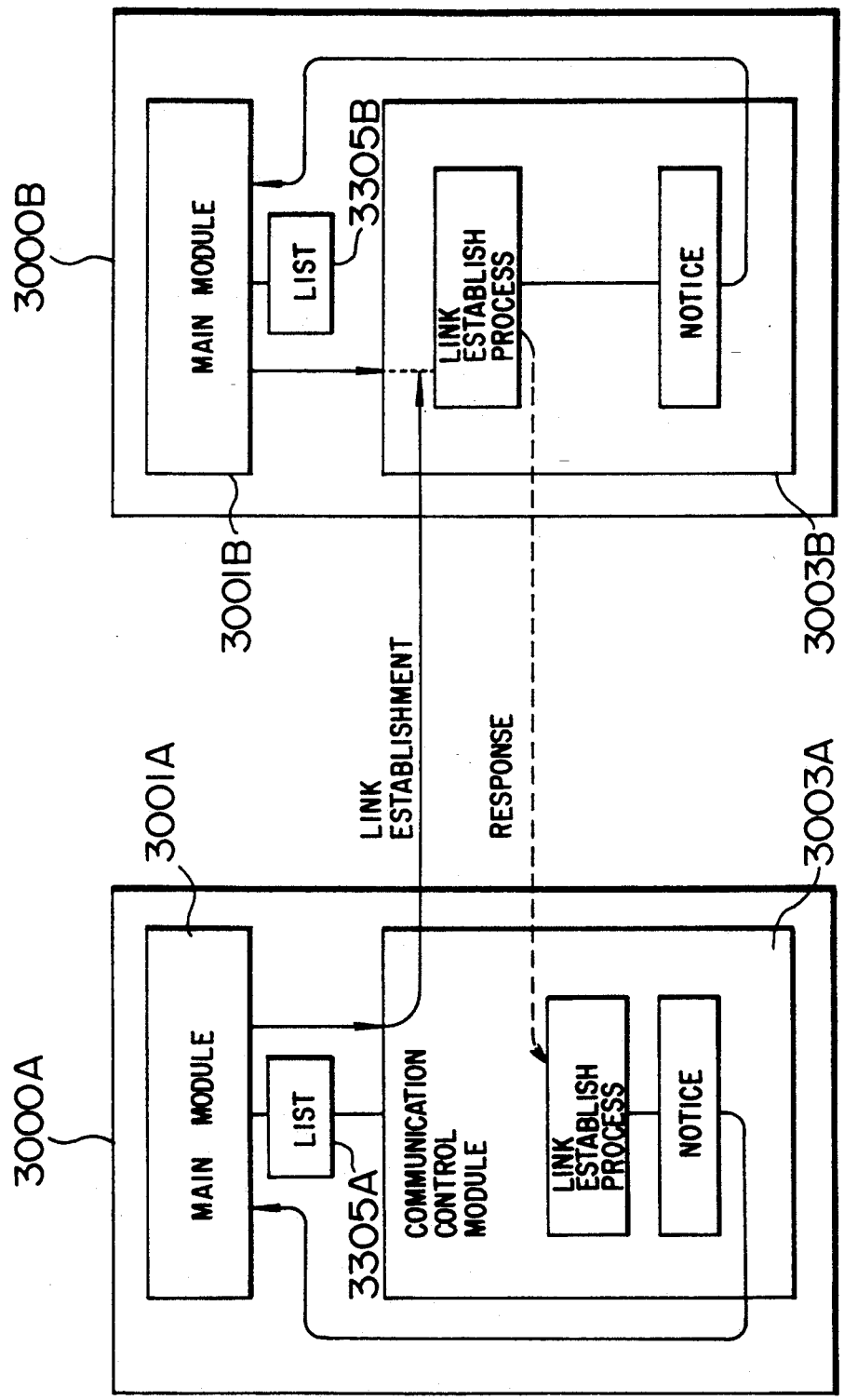
FIG. 6 is a diagram showing a procedure for establishing a logical link between two terminals (nodes)

FIG. 6 illustratively shows a method of establishing a logical link between two nodes 3000A and 3000B. When a node in a link establishment wait state receives a notification indicating an establishment of a logical link from another node, a link is configured therebetween. The logical link establishment notice is passed to the destination node in the form of a message loaded with its own node number, a destination workstation address, and a destination program control program) identifier. Reference numeral 3305 designates a memory area for storing therein the participant members and node numbers.

Figure 7:
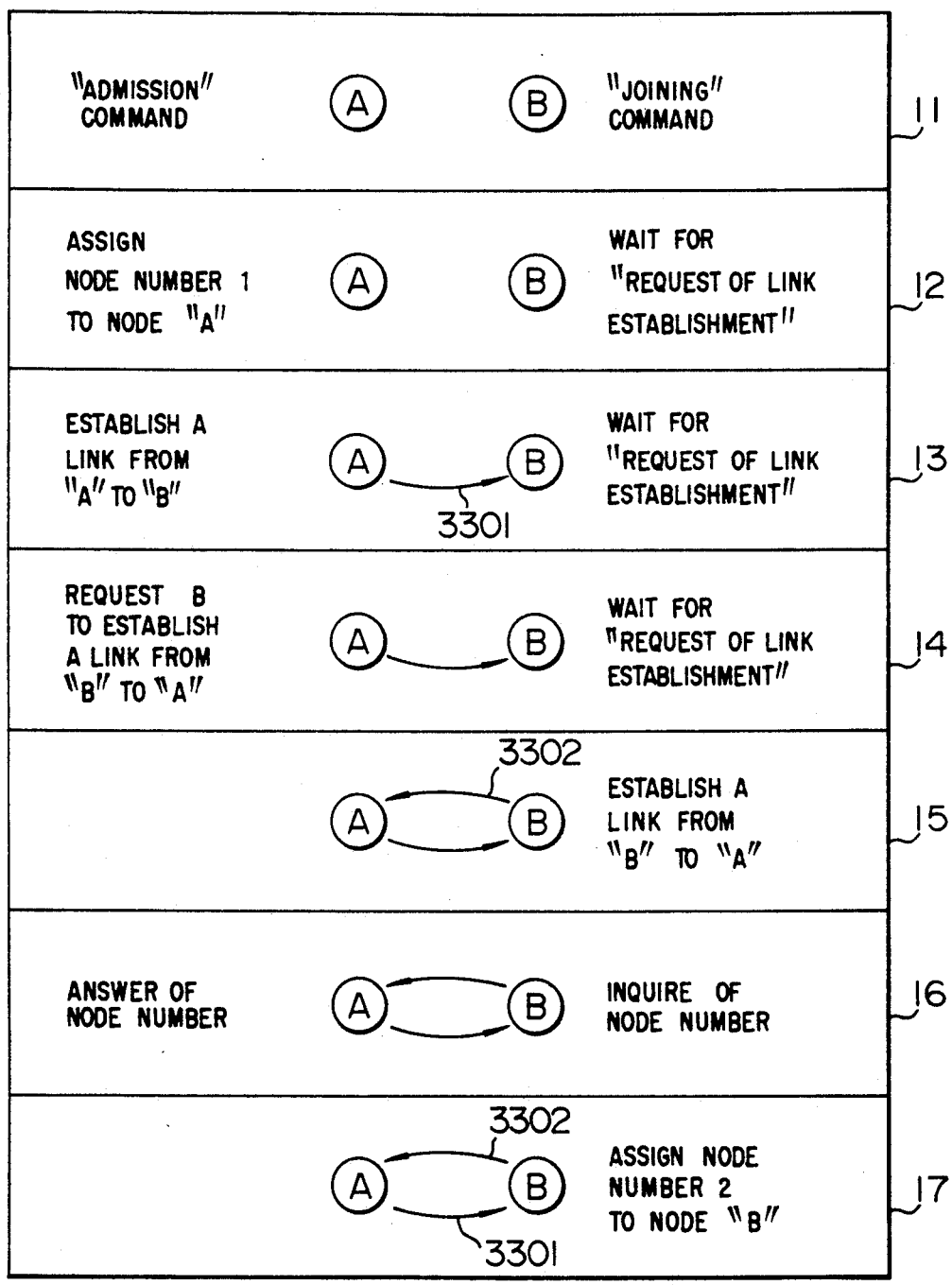
FIG. 7 is a diagram for explaining a procedure of configuring a joint project environment including two terminal apparatuses (nodes)

FIG. 7 shows transition of the link state when a logical ring path including two links 3301 and 3302 is established between two nodes A and B. Prior to an initiation of a joint project, the users of the nodes B and A respectively input a joining command C1 and an admission command C2 (step 11)

The node B of the joining command waits for a link establishment notice and a link establishment request from the node A. On the other hand, the node A of the admission command assumes that its own node is the first participant in the communication system and assigns a node number "1" thereto (step 12) and then establishes a logical link 3301 from the node A to the node B (step 13). This is accomplished by sending a link establishment message to the node B. Subsequently, the node A transmits to the node B a message including a command requesting a establishment of a logical link 3302 from the node B to the node A (step 14). In response to the request command, the node B establishes a logical link 3302 from the node B to the node A (step 15). In this situation, the node B has not been assigned a node number (other than an identifier of the relevant control program) yet. The node B hence sends a message to the ring path in the form of a node number enquiry. On receiving the message, the node A adds its own node number and a user name of the participant to the enquiry message so as to relay the message to a next node on the ring path (step 16). Receiving the request message, the node B recognizes the node number assigned to the other node in the electronic communication system, and thereby assigns a unique node number "2" to its own node.

Figure 8:
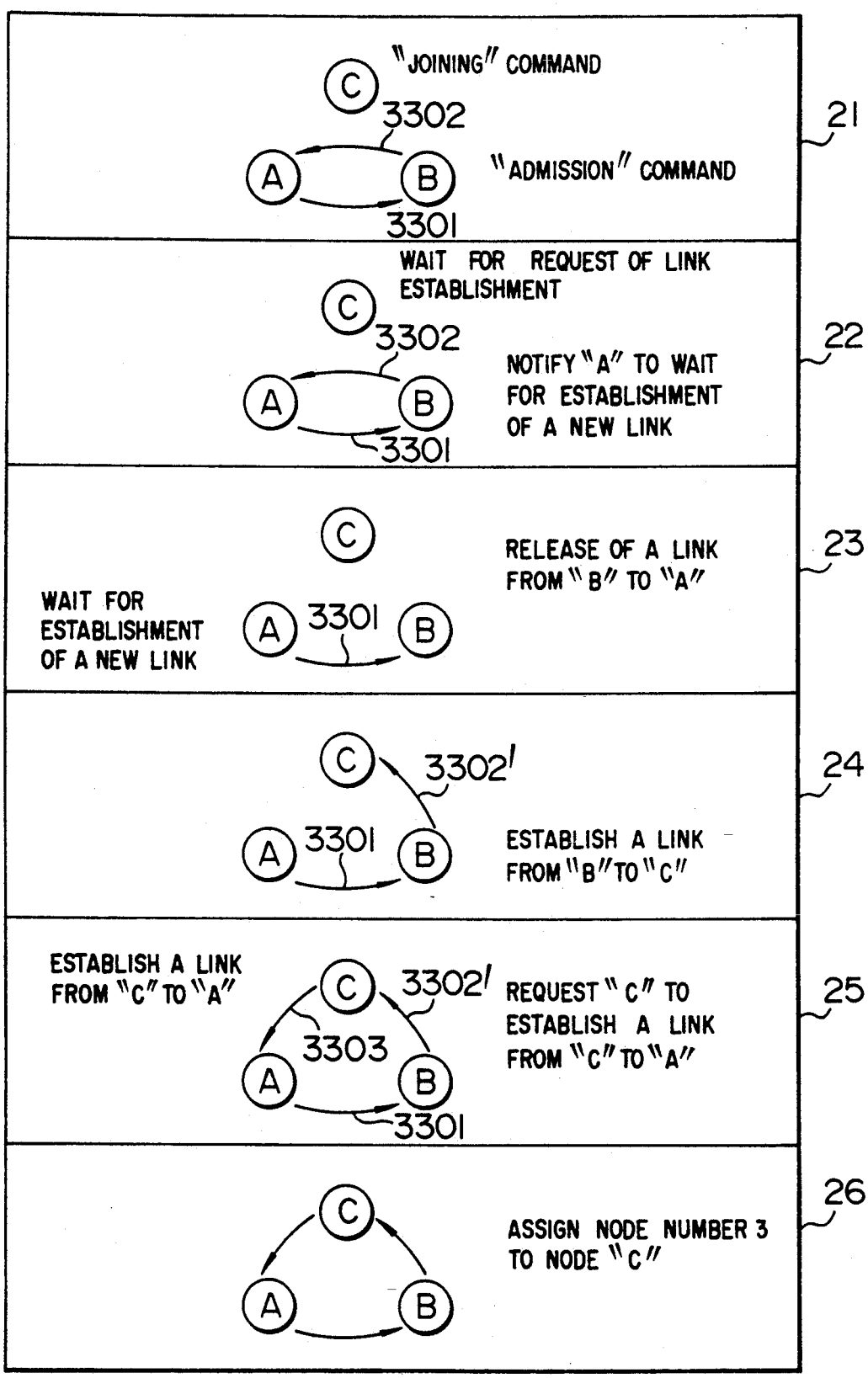
FIG. 8 is a diagram useful to explain a procedure to be accomplished in the case where a new node participates in a joint project including two nodes.

FIG. 8 shows transition of the link state in a case where a node C additionally joins in a joint project involving nodes A and B. A joining command is inputted to the node C to invite node C to be a new member, whereas an admission command is inputted to either one (the node B in this example) of the other nodes (step 21). The node C awaits, like the node B of FIG. 7, a link establishment request from the other node (step 22). In a situation where there has been formed a joint project between a plurality of nodes, when an admission command is received, the node B issues to the adjacent node A o the downstream side in the ring path a command (Command) which instructs the node A to enter a wait state awaiting establishment of a new link after the link 3302 is released (step 22).

The node B having transmitted the A-command releases the link 3302 (step 23) and then establishes a new link 3302' between the nodes C and B (step 24). Subsequently, the node B supplies the node C with a command (B-command) to request establishment of a new link from the node C to the node A. In response to a reception of the B-command, the node C forms link 3303 to the node A (step 25). Thereafter, the node C conducts a procedure similar to the procedure related to the steps 16 and 17 of FIG. 7 to assign a unique node number "3" thereto (step 26).

Figure 9:
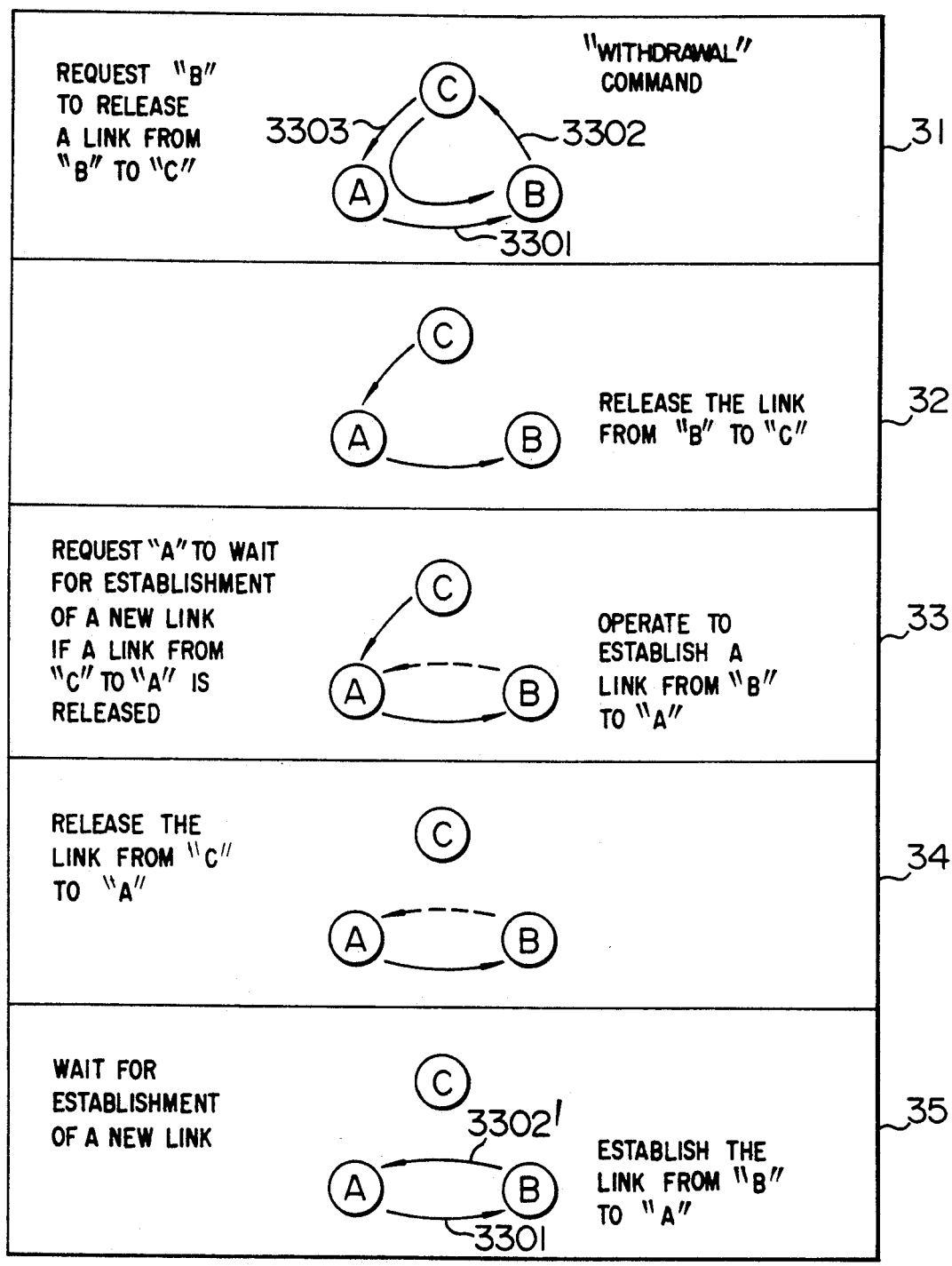
FIG. 9 is a diagram for explaining a procedure to be used in the case where a node withdraws from a joint project including three nodes.

FIG. 9 shows transition of the link state when the node C withdraws from the electronic communication environment including the nodes A, B, and C. When a withdrawing command is inputted, the node C sends to the adjacent node B on the upstream side in the ring path a command (C-command) requesting a release of the link 3302 from the node B to the node C (step 31). In response to the C-command, the node B releases the link 3302 (step 32). Next, the node C issues to the upstream node B adjacent thereto a command (B-command) for an establishment of a new link from the node B to the node A and to the downstream node A adjacent thereto a command (A-command) for achieving a wait operation to await establishment of a new link after the link 3303 is released (step 33). The node C then releases the link 3303 (step 34). When the node A enters a state waiting for the link establishment, a new link 3302' is formed from the node B to the node A (step 35).

Figure 10:
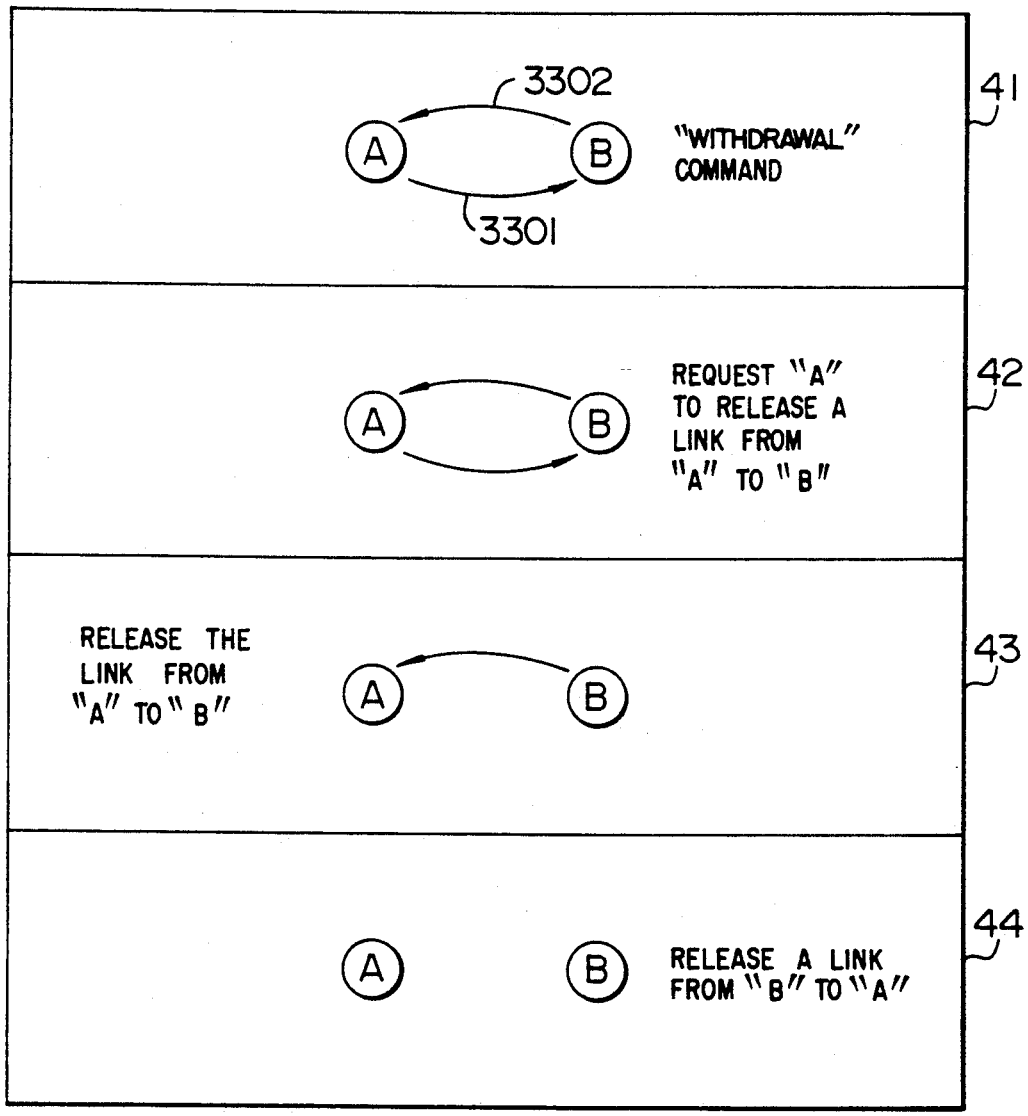
FIG. 10 is a diagram for explaining a procedure to be achieved in the case where a joint project including two nodes is to be terminated.
Figure 11:
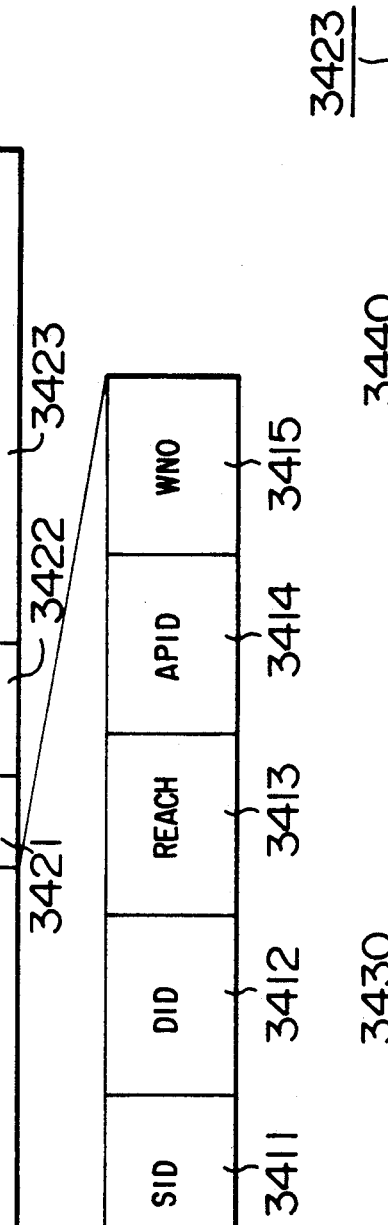
FIG. 11 is a diagram showing an example of a format of a message communicated between terminals (nodes)

FIG. 10 shows transition of the link state where, in a system environment forming a joint project involving nodes A and B, one of the nodes (the node B in this case) withdraws therefrom. The withdrawing node B sends, like the node C of FIG. 9, to the upstream adjacent node A a command (C-command) for a release of the link 3301 from the node A to the node B (step 42). When the node A releases the link 3301 in response to the C-command (step 43), the node B releases the link 3302 from the node B to the node A (step 44). FIG. 11 shows a format of messages communicated between the joint project control programs for transmitting input data and control commands for the logical link establishment/release. The message includes a header field 3410 and a content field 3420.

The header field 3410 comprises an identifier (SID) 3411 of a message source, an identifier (DID) 3412 of a message destination, an information item (REACH)

3413 indicating necessity/unnecessity of processing in a node relaying the pertinent message, an identifier (APID) 3414 of an application program to process a command or data in the content field 3420 of the message, and an identifier (WNO) 3415 for identifying a resource or a window. On the other hand, the content field 3420 includes a field 3421 denoting a length of the field 3420, a field 3423 to be loaded with data or information, and a code field 3422 designating the kind of data or information in the field 3423.

The code field 3422 is employed to indicate one of the command types of the A-command to the C-command, whereas the field 3423 is loaded with information identifying a link to be established or released.

Figure 12:
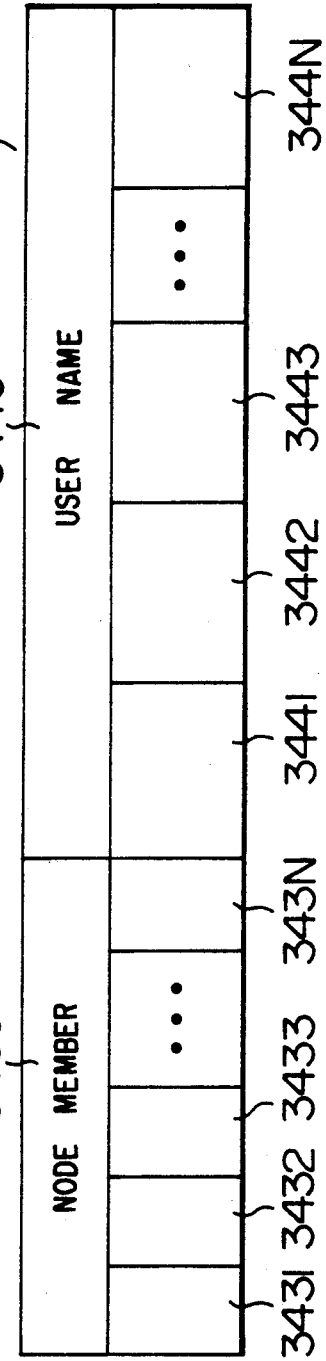
FIG. 12 is a diagram showing an example of a layout of a content section of an enquiry message for a node number.

FIG. 12 shows contents of the information field 3423 of an enquiry message for a node number. The node number enquiry message comprises a node assignment flag field 3430 and a user name field 3440. Each flag field 3430 includes node number areas 3431 to 343N, where N is the maximum number of nodes to participate in a joint project in the system. Similarly, each user name field 3440 includes user name registration areas 3441 to 344N. On receiving the enquiry message, a node respectively loads the node number area and the user name area with a node number i and a user name assigned thereto in a sequential manner so as to send the resultant message to the next workstation. In this regard, in place of the loading of the node number, there may be achieved an operation to set a flag bit in an i-th number area. According to the present invention, using the enquiry message, the node of the new participant acquires information about the current members of the joint project and stores the member identifications in a member list, which is then presented as a member list 1500 on the display screen. Moreover, the joining or withdrawing node supplies the other nodes with a member update message reporting its own node number and its own user name. On receiving the member update message, the other nodes update the contents of the member lists in the respective workstations.

Referring now to FIGS. 13 to 19, a description will be given of processing routines of the control program of each workstation for achieving the logical ring path control described above.

Figure 13:
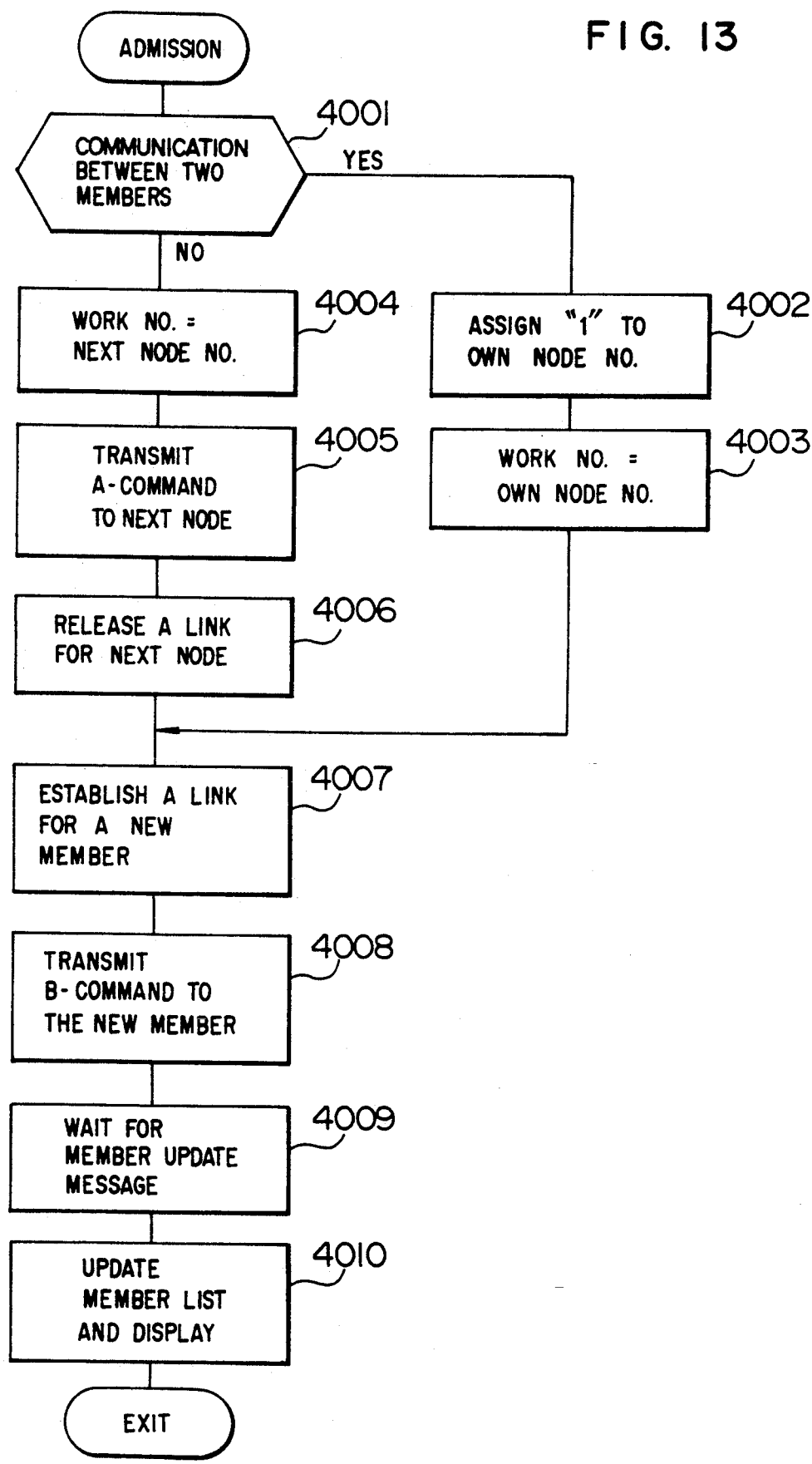

FIG. 13 is a flowchart of a routine to be executed in response to an input of an admission command. On receiving the admission command, the node checks to determine whether two or more members are included in a joint project in the system in which the new member as to participate (step 4001). In the case of a communication between two parties, a node number "1" is assigned to its own node (step 4002), this node number "1" is moved to the parameter named WORK NO. (step 4003), and a logical link is established by sending a control message through the network to the partner node (member) to participate in the joint project (step 4007).

Subsequently, the node sends to the new node a B-command requesting establishment of a logical link from the new node to a node specified by the content of the parameter called WORK NO. (i.e. its own node or a downstream node adjacent thereto) (step 4008), thereby entering a state awaiting a member update message (step 4009). On receiving the member update message, the new node registers the node number and the user name of the new member in the member list 3305 and then updates the member list 1500 on the display screen (step 4010), which terminates the processing of the routine.

In a state where a joint project has been started between two or more nodes, when a node receives an admission command, the node loads the parameter WORK NO. with a node number of a downstream adjacent node (next node) specified in the member list 3305 (step 4004) and supplies the next node with an A-command requesting a wait operation awaiting an establishment of a new link after an existing link to the next node is released (step 4005). The node then releases the link by sending a control message to the next node (step 4006) and passes control to a step 4007.

FIG. 14 is a flowchart of a routine to be executed in response to an input of a joining command. A node having received a joining command waits for a control message indicating establishment of a logical link from the upstream adjacent node to its own node (step 4101). When the link is established, the node enters a state awaiting a reception of a B-command (step 4102). At this point of time, the node number of the destination has not been determined; consequently, a default value is set as the destination identifier of the B-command. On receiving the B-command, the node sends a control message to establish a new logical link therefrom to a next node specified by the content of the information field of the B-command (step 4103). Thereafter, the node number enquiry routine of FIG. 15 is executed (step 4104) and then the member list is displayed (step 4105).

The node number enquiry routine creates a node number enquiry message including the source node number field loaded with the default value as shown in the flowchart of FIG. 15 to transmit the message and then enters a state awaiting return of the enquiry message (steps 4121 to 4123). On receiving the enquiry message, the routine determines, based on contents of the information field of the message, a node number and a member name associated with the node for the enrollment in the joint project so as to assign a unique node number different from the determined number to its own node (step 4124). Thereafter, in order to identify the assigned node number and a new user name thereof to the other nodes, a member update message is transmitted as a broadcasting message onto the communication path (step 4125). The user name mentioned above may be one inputted by the user from the input device 2500 (step 4123) or one already inputted and stored in a memory area.

FIG. 16 is a flowchart of routine to be executed at reception of a node number enquiry message issued by another node. A node having received the message sets its own node number and its own user name in the received message (step 4201) and then relays the resultant message to the next node or workstation (step 4202).

FIG. 17 is a flowchart of a routine to be achieved at reception of an A-command issued in the step 4005 of FIG. 13.

A node having received the A-command enters a wait state for awaiting a release of a logical link by an upper stream adjacent node (step 4301). On recognizing the release of the logical link, the node waits for establishment of a new logical link thereto (step 4302). When the new logical link is established, the node awaits the reception of a member update message (step 4303). On receiving the member update message, the node modifies the contents of the member list 3305 and the member list 1500 on the display screen depending o the contents of the message (step 4304).

Figure 18:
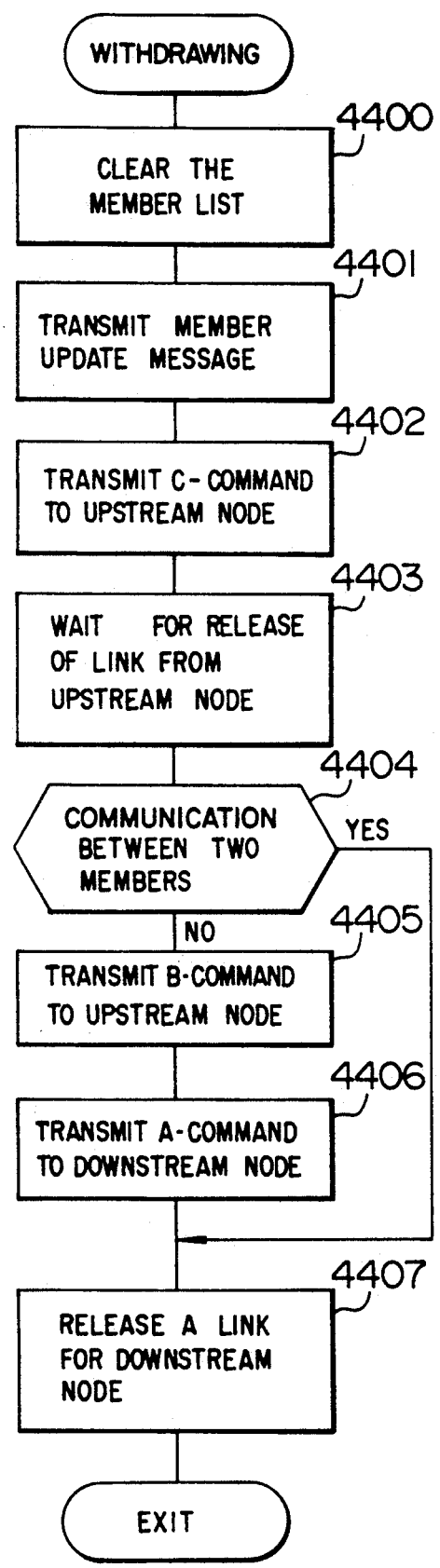

FIG. 18 is a flowchart to be effected in response to reception of a withdrawal command.

At reception of a withdrawal command, the routine initializes the member list 3305 and then clears the member list 1500 on the display screen, namely, sets the list 1500 to a state where the number of members is 0 (step 4400). Subsequently, in order to notify the other nodes that its own node has been withdrawn from the work project environment, a member update message is transmitted onto the ring path (step 4401). On receiving the message, each of the other nodes modifies the participant member list 3305 and deletes the withdrawn member from the display list 1500 on the screen. Thereafter, a C-command is transmitted to an upstream adjacent node to request a release of a logical link therefrom to its own node (step 4402) and then enters a wait state awaiting release of the link (step 4403).

When the logical link is released, a check is conducted to determine whether the joint project include two members or not (step 4404). If this is the case, a link from its own node to a downstream adjacent node is released, thereby terminating the routine (step 4407).

When the joint project includes more than two users, a B-command is sent to the upstream node to request an establishment of a new link to the downstream node (step 4405). Thereafter, on detecting a release of the link, an A-command is transmitted to the downstream node requesting the down stream node to wait for establishment of a new link (step 4406), and then the link to the downstream node is released.

Figure 19:
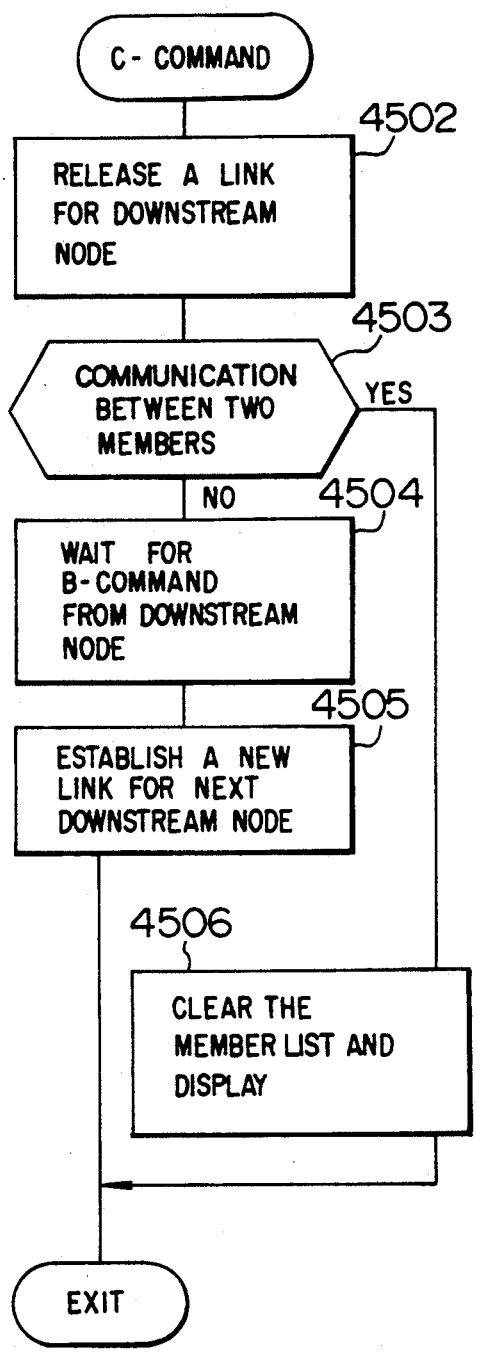

FIG. 19 is a flowchart of a routine to be carried out by a node which has received a C-command.

The node having received the C-command releases the link to the downstream node specified by the C-command (step 4502). Next, a check is made to determine the number of participant members in the joint project (step 4503). If the system includes only two users, the member list 3305 and the member list 1500 on the display screen are cleared (step 4506).

In the case where more than two members constitute the joint project, the node awaits reception of a B-command (step 4504). At reception of the B-command, the node establishes a new link to the node specified by the B-command (step 4505), thereby terminating the execution of the routine.

As many apparently widely different embodiments of the present invention can be made without departing from the spirit and scope thereof, it is to be understood that the invention is not limited to the specific embodiments described herein, except as defined in the appended claims.

We claim:

1. An information processing and communication system including a plurality of terminals linked with each other via a logical ring-like bath established in a communication network, wherein:
    each of said plurality of terminals comprises:
    (a) input means to be operated by a user for inputting a data item and/or a command;
    (b) data processing means for executing a predetermined data processing operation to produce information to be referred to by the user depending on the input data item and/or the command received from said input means and from the communication network and for transferring the input data and/or the command to one of the other terminals via the communication network in an order in which the input data and/or the command is received; and
    (c) display means coupled to said data processing means for displaying thereon information to be referred to by the user;
    said data processing means further including:
    control means cooperating with at least one of the control means in the data processing means disposed in the other terminals for establishing a logical ring-like path in the communication network to connect a plurality of said data processing means and for reconfiguring said logical ring-like path by transmission of control messages to the control means of other terminal via the communication network when a control command instructing the addition of a new terminal to or the withdrawal of one of said plurality of terminals from said logical ring-like path is inputted from said input means;
    means for storing in a memory node identifiers assigned to said other data processing means linked via the logical ring-like path and user identification information of each of the terminals associated with said other data processing means, said node identifiers and said user identification information being indicated by said control messages; and
    means for outputting to said display means the user identification information stored in said memory.

2. A system according to claim 1 wherein each of said control means comprises:
    means responsive to a first control command instructing the joining of a new member in or a second control command instructing withdrawal of a current member from said logical ring-like path and for communicating said control messages with upstream and downstream terminals adjacent thereto on the logical ring-like path to establish or to change the configuration of the logical ring-like path; and
    means responsive to a control message received from an adjacent terminal for updating contents stored in said memory.

3. A status display method for use in an information processing and communication system including a plurality of terminals linked with each other via a communication network, each terminals being provided with an input device, a display device, and control means for executing a data processing in cooperation with control means in the other of said plurality of terminals, said method comprising the steps of:
    establishing on the communication network a logical ring-like path for linking a plurality of said control means participating in a joint processing with each other;
    storing in a memory a participant member list comprising identifiers of the control means linked via the logical ring-like path and user identification information assigned to said terminals in which said control means are operating, respectively;
    displaying on a display screen of said terminal an identification of the members participating in said joint processing from the participant member list stored in the memory;
    transmitting a control message including information indicating a change in members participating in said joint processing to the other control means from one of said control means when a terminal is additionally joined in or withdrawn from the logical ring-like path; and
    when a control message is received, updating the contents of the participant member list in the memory based on the information contained in the receiver message and information included in the participant member list displayed on the display screen of said terminal.

* * * * *